F. A. MERSHON.
SPRING WHEEL.
APPLICATION FILED SEPT. 16, 1915.
1,205,555.
Patented Nov. 21, 1916.
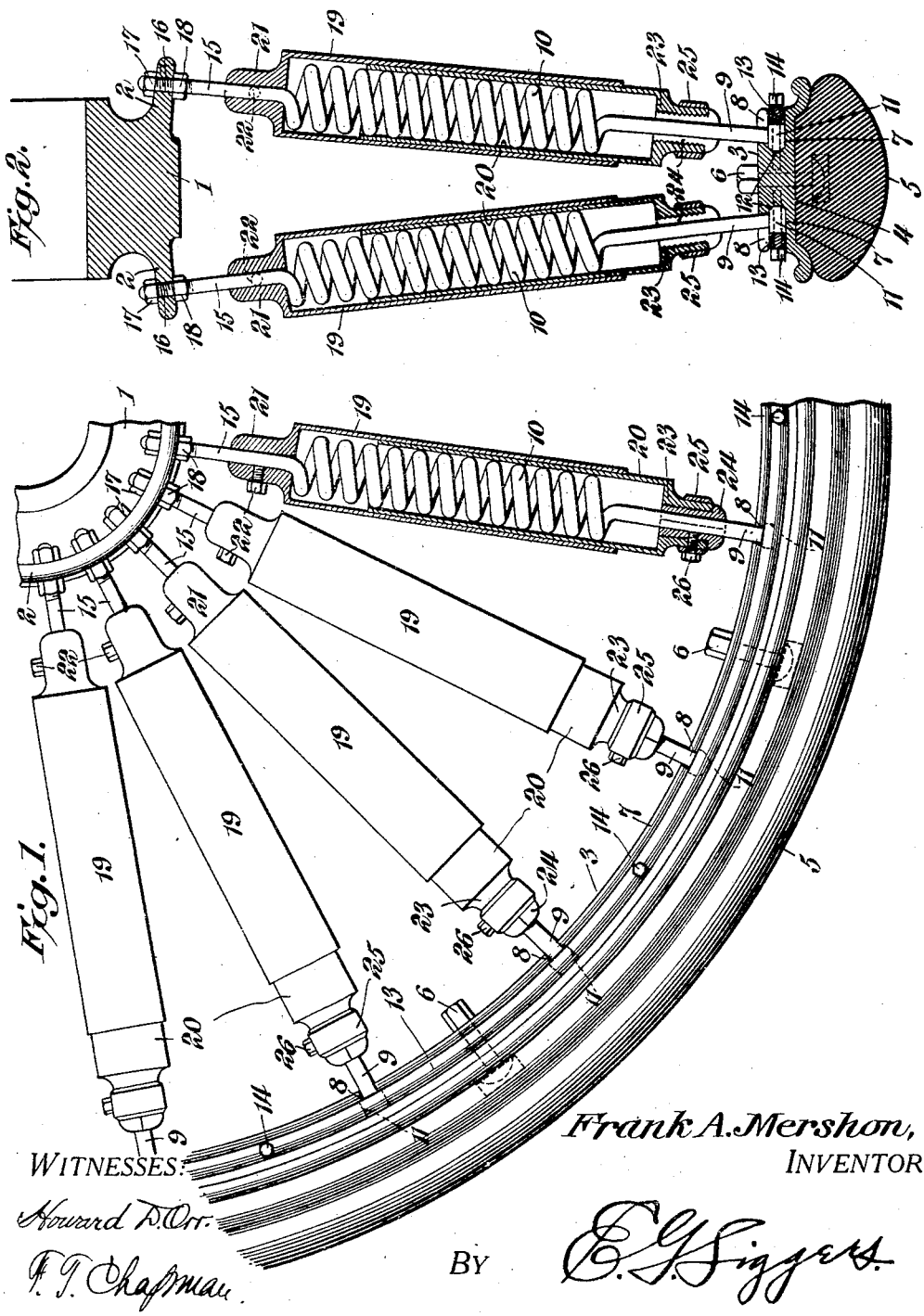
Frank A. Mershon,
INVENTOR,
WITNESSES:
BY
Attorney

UNITED STATES PATENT OFFICE.

FRANK ANDERSON MERSHON, OF RED HILL, VIRGINIA.

SPRING-WHEEL.

1,205,555. Specification of Letters Patent. Patented Nov. 21, 1916.

Application filed September 16, 1915. Serial No. 51,025.

*To all whom it may concern:*

Be it known that I, FRANK A. MERSHON, a citizen of the United States, residing at Red Hill, in the county of Albemarle and State of Virginia, have invented a new and useful Spring-Wheel, of which the following is a specification.

This invention has reference to spring wheels and is designed to produce a wheel for automobile and other uses, wherein the needed elasticity is provided for in the body of the wheel, so that the wheel may be equipped with a solid rubber or other tire without loss of the qualities usually obtained with a pneumatic tire, but with the elimination of puncture and other like troubles common with pneumatic tires.

In accordance with the present invention the wheel spokes are composed of elongated springs under suitable initial extension to provide for sustaining the load with the springs constituting the only connection between the hub and rim portions of the wheel, and with the springs so arranged as to resist side movements of the wheel; that is, movements in the same direction as the length of the wheel axle.

The invention contemplates means for attaching the spring spokes to the hub and rim and for protecting the springs from possible injury without, however, interference with their expansion and contraction.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—Figure 1 is a side view of a portion of a wheel equipped with the present invention and showing one of the elements of a spoke in longitudinal diametric section. Fig. 2 is a section through one of the spokes in a plane at right angles to the plane of Fig. 1.

Referring to the drawings there is shown a hub 1 provided on opposite sides with laterally outstanding circumferential flanges 2, there being a flange 2 on both the inner and outer faces of the hub adjacent to the spoke edge of the hub. No attempt is made to show the internal structure of the hub, since the hub may follow the usual practice in this respect, and the only change over existing hubs is with regard to the flanges 2, which have a spread in a direction lengthwise of the axis of rotation to avoid any material side movement of the wheel; that is, a movement in the direction of the length of the axis of the wheel. There is also provided a rim 3 having an outer circumferential channel 4 to receive a tire 5 held to the rim by bolts 6 or in any other suitable manner. The conformation of the rim as to its tire receiving portion, the shape of the tire itself, and the manner of fastening the tire to the rim are not material to the present invention, and hence need no particular description.

The rim has circumferential channels 7 extending laterally into the sides of the rim between the inner and outer surfaces thereof and arranged on opposite sides of the circumferential center line of the rim. The inner circumferential walls of these channels, that is, the walls toward the hub of the wheel, have notches 8 formed in them at spoke intervals about the rim. The notches 8 are designed to receive shank ends 9 of elongated helical springs 10. The shanks 9 terminate at the ends remote from the bodies of the springs in heads 11 adapted to enter the channels 7 with the shanks 9 in the notches 8, and these heads may seat in recesses 12 extended into the rim 4 from the channels 7. The heads 11, and consequently the shank ends 9 of the springs 10, are held in their seats in the rim by rings 13 seated in the channels 7 and held thereto at suitable intervals by screws 14.

Those ends of the springs remote from the shanks 9 are provided with similar shanks 15 each terminating in a screw-threaded portion 16 extended through appropriate passages in the flanges 2 to which they are locked by nuts 17, 18 clamped against opposite faces of the particular flange through which the shank 15 extends.

The head receiving recesses in the rim 3 are, as seen in Fig. 2, relatively close together, while the passages for the shanks 15 in the two flanges 2 are considerably more separated so that the members of each spoke, made up of two springs 10, converge from the hub toward the rim. The result of this is that the springs while quite elastic, resist any side movement of the wheel with respect to the line of travel. Should there be a tendency for the wheel or the vehicle to have a side movement, all the springs on one side or the other of the wheel will resist such movement.

In order to protect the springs from injury and the effects of dirt and dust, and also to in a measure stiffen the spokes and cause them to present a neat appearance, the coiled or body portion of each spring 10 is incased in a telescoping casing made up of two telescoping sleeves 19, 20, respectively. The sleeve 19 has a head 21 at one end embracing the stem 15 and held thereto by a set screw 22. The sleeve 20 has a head 23 in surrounding relation to the shank or stem 9, but separated therefrom by a longitudinally split plug 24 directly surrounding the stem 9 and screwed into the head 23, said head and plug being appropriately threaded for the purpose. The head 23 is reinforced by an exterior collar 25 made fast thereto and a set screw 26 traversing the collar and head and also traversing the nut 24 holds the sleeve 20 in fixed relation to the stem 9. With such an arrangement the spring 10 is effectively protected from harm due to contact with exterior objects or from the effects of dust or dirt which might otherwise accumulate on the spring. At the same time the spring is free to expand and contract because of the telescoping action of the two sleeves 19 and 20. Moreover, the sleeves may be made of some light elastic material which will permit a limited bending of the spokes such as would occur in those spokes which in the course of rotation of the wheel approach the horizontal, and which bending or yielding must occur to permit the contraction and expansion of the springs which are more nearly in the upright position and, therefore, sustain the major portion of the load.

Either member of each spring spoke is readily detached by removing the ring 13 holding the particular spoke in place, whereupon the head 11 is moved out of its seat in the rim and the spoke is readily detached from the particular flange 2 by the removal or loosening of one or both nuts holding it. A broken spring is readily replaced without any necessity of dismantling the wheel or disturbing any spring except the one to be replaced. The same facility for repairs is present with respect to all of the spoke members.

Since the construction permits of the use of many spokes, a single broken spring is not of great moment and may be neglected until such time as it is convenient to replace it, wherefore road repairs are not necessary as would be the case with a pneumatic tire. Even should a spring break the broken parts are securely held since in the great majority of instances the break occurs in the coiled portion of the spring, and such coiled portion is incased in the telescoping casing made up of the two sleeves 19 and 20.

Since the sleeves 19 and 20 need not at any time bend more than a very small distance, they may be made of thin steel or other suitable metal, and may have some play, but not enough to produce rattling.

The sleeves of each telescoping pair, by fitting closely enough one on the other, form a pneumatic cushion active both on elongation and contraction and thereby contributing to the elasticity of the wheel and counteracting by a dash-pot effect the tendency to rapidly yield and rebound characteristic of springs.

What is claimed is:—

1. A spring wheel having spokes comprising coiled springs connected to the hub and rim of the wheel, respectively, and pneumatic dash pots consisting of telescoping members located between the hub and rim, the springs and dash pots being in coactive relation to each other and the members of each dash pot participating in the contracting and elongating movements of the respective springs, whereby the dash pots constitute pneumatic cushions contributing to the elasticity of the wheel and serving as retarding means counteracting rapidity of response of the springs to elongation and contraction.

2. A spring wheel having spokes composed of elongated coiled springs with the ends connected to the hub and rim of the wheel, respectively, and a dash pot for each coiled spring consisting of a pair of telescoping sleeves carried solely by the spring and having telescoping movements corresponding in extent to the elongation and contraction of the coiled part of the spring, whereby each dash pot counteracts the tendency of the respective spring to rapidly respond to contracting and expanding forces.

3. A spring wheel having spokes composed of elongated coiled springs each with extended terminal shanks with one shank screw threaded at the ends and the other shank formed with an expanded head for attachment of the springs to the hub and rim portions, respectively, of the wheel, and a cover member for each spring comprising two telescoping sleeves each terminating in a head secured to a respective one of the shanks of the spring, the head of the sleeve connected to the shank of the spring having an expanded head thereon being provided with a split bushing for permitting the passage of the head of the shank of the spring and providing a close fit of the sleeve to the shank of the spring.

4. A spring wheel having spokes composed of elongated coiled springs with extended terminal shanks for attachment of the springs to the hub and rim, respectively, of the wheel, and a pair of telescoping sleeves on each spring carried solely by the spring and each attached to a respective shank of the spring, said sleeves constituting a dash pot counteracting the tendency of the springs to rapidly respond to contracting and expanding forces.

In testimony, that I claim the foregoing as my own, I have hereto affixed my signature in the presence of two witnesses.

FRANK ANDERSON MERSHON.

Witnesses:
E. B. PERRY,
GUY F. VIA.

Copies of this patent may be obtained for five cents each, by addressing the "Commissioner of Patents, Washington, D C."